Jan. 7, 1936. R. W. MILLER 2,027,243
REEL SEAT FOR FISHING RODS
Filed March 12, 1934
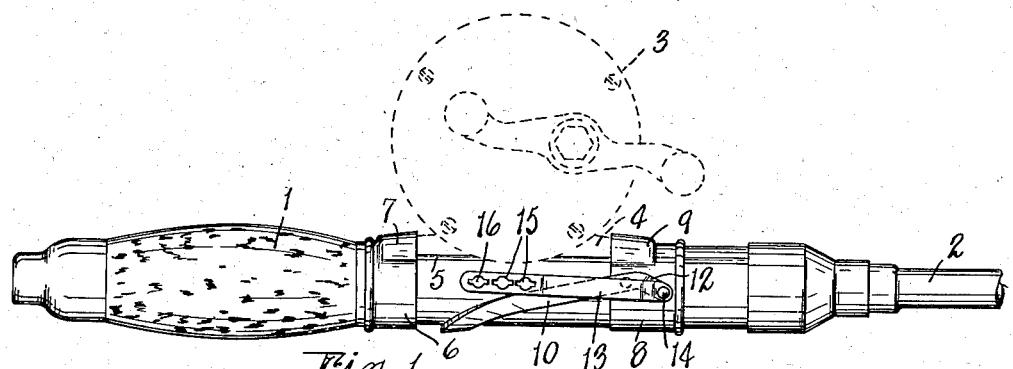
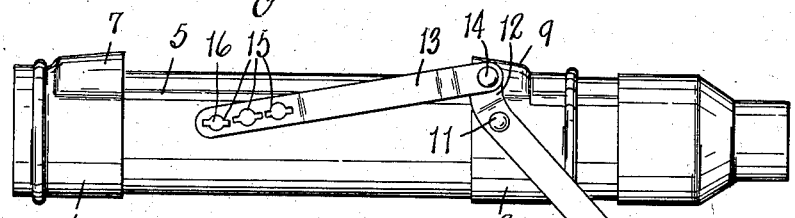
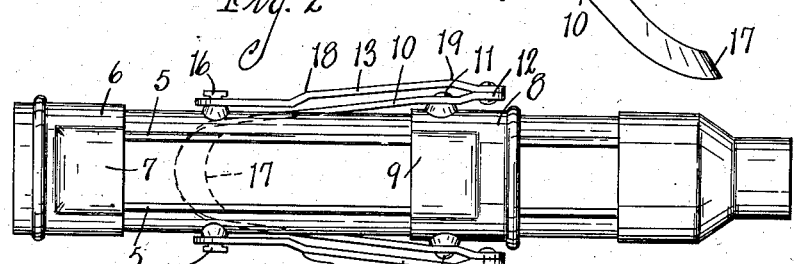
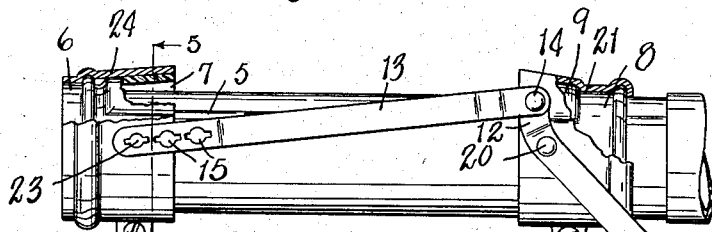
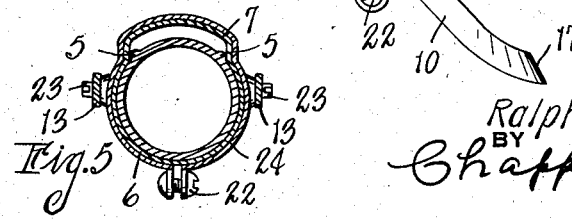
INVENTOR
Ralph W. Miller
BY
Chappell Earl
ATTORNEYS

UNITED STATES PATENT OFFICE 2,027,243

REEL SEAT FOR FISHING RODS

Ralph W. Miller, Glendale, Calif., assignor of one-half to Willis H. Bullinger, Los Angeles, Calif.

Application March 12, 1934, Serial No. 715,146

20 Claims. (Cl. 43—22)

The main objects of this invention are:

First, to provide a reel seat for fishing rods which may be quickly manipulated to secure or release the reel and one which very securely retains the reel when in actuated position.

Second, to provide a reel seat having these advantages which may be readily adjusted to accommodate a considerable variation in reels or their reel seat plates.

Third, to provide a reel seat for fishing rods having these advantages which is quite economical in structure and very durable.

Fourth, to provide a reel seat attachment which may be readily applied to standard reel seats or types of reel seats now in extensive use.

Objects pertaining to details and economies of my invention will definitely appear from the description to follow. The invention is defined in the claims.

A structure which embodies the features of my invention is clearly illustrated in the accompanying drawing, in which:

Fig. 1 is a side elevation of a rod handle section or member embodying the features of my invention, the rod being broken away and the reel being indicated by dotted lines.

Fig. 2 is a fragmentary side elevation with the parts open or in reel releasing position.

Fig. 3 is a fragmentary plan view with the parts in closed position.

Fig. 4 is a fragmentary side elevation of a modified form or embodiment of my invention, primarily designed as an attachment for an extensively used type of reel seat.

Fig. 5 is a transverse section on line 5—5 of Fig. 4.

In the embodiment of my invention illustrated, 1 represents the handle section of a fishing rod and 2 a portion of the rod. A reel 3 is conventionally illustrated by dotted lines, the reel seat plate being shown at 4. The rod member 1 is provided with longitudinal ribs 5 spaced to receive the seat plate of a reel as 4 between them. At one end of these ribs is a relatively fixed clamping member 6 in the form of a sleeve or collar having an offset 7 receiving or adapted to receive one end of the seat plate 4 of the reel. The co-acting clamping collar 8 is slidably mounted on the rod member and has an offset 9 corresponding to the offset 7 adapted to receive the other end of the reel seat plate and engaging the ribs to prevent rotative movement of the collar on the rod member. The collar 8 is slidably mounted on the rod member so that it may be moved rearwardly to release or permit the positioning of the reel seat plate, and then moved forwardly to clamp the positioned reel seat plate.

In the preferred embodiment of my invention illustrated in Figs. 1, 2 and 3 a U shaped lever 10 is pivoted upon the sliding or movable clamping member, this clamping member being provided with laterally projecting oppositely disposed studs 11 with which the arms of the lever are detachably engaged. The resilience of the lever acts to hold the lever in engagement with the studs.

The lever is pivoted on the studs with the ends of the arms 12 projecting beyond the pivots, and these projecting ends are bent or offset as clearly shown in the drawing. Links 13 are pivoted to the ends of the lever at 14 and have a series of key-hole slots or openings 15 selectively engageable with the T headed studs 16 disposed oppositely on the sides of the rod member. The openings 15 are such that the links may be slipped over the T heads when the slots are properly alined therewith, the links being retained on the studs when the links are swung from the alined position, which is their normal position.

The bight end 17 of the lever is laterally offset and conformed by twisting the same so that when the lever is in its closed or actuated position it lies flat against the under side of the rod member, as shown in Fig. 1, in which position the links, which have offsets or bends 18 and 19 therein, lie at the sides of the rod member and in overlapping relation to portions of the lever. These offsets in the links permit the links to swing across the pivot axis of the lever as the lever is swung from open to closed position, that is, the pivots connecting the links to the lever arms, the lever pivots and the link pivots, are so disposed that the pivots 14 swing across the plane of the axis of the lever and the studs, thereby providing a locking toggle which secures an effective clamping action and also securely locks the parts in clamping position.

In the embodiment of my invention shown in Figs. 4 and 5 the lever pivots 20, corresponding to the pivots 11 of the embodiment of Figs. 1–3, are mounted on a split collar 21 embracing the clamping member 8. This split collar has projecting ears connected by the clamping screw 22. The studs 23 of this embodiment, corresponding to the studs 16, are carried by a split collar 24, which embraces and is clamped upon the clamping member 6. This modified form of my invention is especially designed to adapt my improvements to reel seats now on the market, that is, to provide a structure which may be embodied in rods in the hands of the user as distinguished from a factory embodiment.

I have not attempted to illustrate or describe other embodiments or adaptations of my invention as it is believed that this disclosure will enable those skilled in the art to embody or adapt the same as may be desired.

Having thus described my invention what I claim as new and desire to secure by Letters Patent is:

1. In a reel seat for fishing rods, the combination of a rod member provided with longitudinal ribs spaced to receive the seat plate of a reel between them, a relatively fixed clamping member adapted to receive an end of a reel seat plate, a coacting clamping collar slidable on said rod member and engaging said ribs whereby its rotative movement on said rod member is prevented, a U shaped lever having its arms pivoted to opposite sides of said slidable clamping collar with the ends of its arms projecting beyond its pivots and being offset, the bight end of said lever being offset and conformed to permit the bight to lie against the under side of the rod member with the arms of the lever at the sides of the rod member when the lever is in clamping position, links pivotally connected to the said offset ends of the arms of said lever, and oppositely disposed T-headed studs at the sides of said handle member, said links being provided with a plurality of key-hole stud engaging slots engageable with said studs when presented in alinement with the heads thereof, the pivots connecting said links to said lever arms being swung past the plane of the axis of the lever and said studs when the lever is swung to clamping position, thereby providing a locking toggle.

2. In a reel seat for fishing rods, the combination of a rod member, a clamping member slidable on said rod member, a U-shaped lever having its arms pivoted to opposite sides of said slidable clamping member with the ends of its arms projecting beyond its pivots and being offset, the bight end of said lever being offset and conformed to permit the bight to lie against the under side of the rod member with the arms of the lever at the sides of the rod member when the lever is in clamping position, and links pivotally connected to the said offset ends of the arms of said lever, and oppositely disposed T-headed studs at the sides of said handle member, said links being provided with a plurality of key-hole stud engaging slots engageable with said studs when presented in alinement with the heads thereof, the pivots connecting said links to said lever arms being swung past the plane of the axis of the lever and said studs when the lever is swung to clamping position, thereby providing a locking toggle.

3. In a reel seat for fishing rods, the combination of a rod member provided with longitudinal ribs spaced to receive the seat plate of a reel between them, a relatively fixed clamping member adapted to receive an end of a reel seat plate, a coacting clamping collar slidable on said rod member and engaging said ribs whereby its rotative movement on said rod member is prevented, a U-shaped lever having its arms pivoted to opposite sides of said slidable clamping collar with the ends of its arms projecting beyond its pivots, and links pivotally connected to the ends of the arms of said lever, and oppositely disposed T-headed studs at the sides of said handle member, said links being provided with a plurality of key-hole stud engaging slots engageable with said studs when presented in alinement with the heads thereof, the pivots connecting said links to said lever arms being swung past the plane of the axis of the lever and said studs when the lever is swung to clamping position thereby providing a locking toggle.

4. In a reel seat for fishing rods, the combination of a rod member, a clamping member slidable on said rod member, a U-shaped lever having its arms pivoted to opposite sides of said slidable clamping member with the ends of its arms projecting beyond its pivot, and links pivotally connected to the ends of the arms of said lever, and oppositely disposed T-headed studs at the sides of said handle member, said links being provided with a plurality of key-hold stud engaging slots engageable with said studs when presented in alinement with the heads thereof, the pivots connecting said links to said lever arms being swung past the plane of the axis of the lever and said studs when the lever is swung to clamping position, thereby providing a locking toggle.

5. In a reel seat for fishing rods, the combination of a rod member provided with longitudinal ribs spaced to receive the seat plate of a reel between them, a relatively fixed clamping member adapted to receive an end of a reel seat plate, a coacting clamping collar slidable on said rod member and engaging said ribs whereby its rotative movement on said rod member is prevented, a U shaped lever having its arms pivoted to opposite sides of said slidable clamping collar with the ends of its arms projecting beyong its pivots, and links pivotally connected to the ends of the arms of said lever, the pivots connecting said links to said lever arms being swung past the plane of the axis of the lever and the link pivots when the lever is swung to clamping position, thereby providing a locking toggle.

6. In a reel seat for fishing rods, the combination of a rod member, a clamping member slidable on said rod member, a U-shaped lever having its arms pivoted to opposite sides of said slidable clamping member with the ends of its arms projecting beyond its pivots, and links pivotally connected to the ends of the arms of said lever, the pivots connecting said links to said lever arms being swung past the plane of the axis of the lever and the link pivots when the lever is swung to clamping position, thereby providing a locking toggle.

7. In a reel seat for fishing rods, the combination of a rod member, a clamping member slidable on said rod member, a U-shaped lever having its arms pivoted to opposite sides of said slidable clamping member with the ends of its arms projecting beyond its pivots, and links pivotally connected to the ends of the arms of said lever, the pivots connecting said links to said lever arms being swung past the plane of the axis of the lever and the link pivots when the lever is swung to clamping position, thereby providing a locking toggle, the arms of the lever being springable to engage and disengage them from the lever pivots and being detachably retained in engagement with the pivots by the resilience of the lever.

8. In a reel seat for fishing rods, the combination of a rod member adapted to receive the seat plate of a reel, a relatively fixed clamping member, a coacting clamping member movable on said rod member, and means for adjusting said movable clamping member to and locking it in clamping position comprising a lever and links pivotally connected to the ends of the arms thereof, said links and lever constituting a toggle, one member of which is pivotally connected to the movable clamping member and the other to the rod member, the bight end of the lever being offset and conformed to permit the bight to lie flat against the under side of the rod member with the arms of the lever at the sides of the rod member when the lever is in clamping position.

9. In a reel seat for fishing rods, the combination of a rod member adapted to receive the seat plate of a reel, a relatively fixed clamping member, a coacting clamping member movable on said rod member, and means for adjusting said movable clamping member to and locking it in clamping position comprising a lever and links pivotally connected to the ends of the arms thereof, said links and lever constituting a toggle, one member of which is pivotally connected to the movable clamping member and the other to the rod member.

10. In a reel seat for fishing rods, the combination of a rod member adapted to receive the seat plate of a reel, a relatively fixed clamping member, a coacting clamping member movable on said rod member, a lever pivotally mounted on said movable clamping member and having offset projecting portions beyond its pivot, and link means adjustably and pivotally connected to the rod member and to the offset ends of said lever, the lever and link means constituting a locking toggle for said adjustable clamp member when the lever is swung to locking position.

11. In a reel seat for fishing rods, the combination of a rod member adapted to receive the seat plate of a reel, a clamping member movable on said rod member, a lever pivotally mounted on said clamping member and having offset projecting portions beyond its pivot, and link means adjustably and pivotally connected to the rod member and to the offset end of said lever, the lever and link means constituting a locking toggle for said adjustable clamp member when the lever is swung to locking position.

12. In a reel seat for fishing rods, the combination of a rod member adapted to receive the seat plate of a reel, a clamping member movable on said rod member, and means for actuating said clamping member to and retaining it in clamping position comprising pivoted link means and a pivoted lever means, one of said means being pivotally connected to the rod member and the other to said clamping member, the pivots being arranged so that when the lever means is swung to clamping position the pivot connecting the link and lever means swings across the plane through the pivots connecting the link and lever means to the rod and clamping members, thereby providing a locking toggle for retaining the parts in clamping position.

13. In a reel seat for fishing rods, the combination with a rod member adapted to receive the seat plate of a reel, a movable clamping member, and means for actuating said clamping member comprising pivoted link means and pivoted lever means, one of said last named means being pivotally connected to the rod member and the other to said clamping member, the pivots being arranged so that the parts constitute a locking toggle when in clamping position.

14. In a reel seat for fishing rods, the combination of a rod member adapted to receive the seat plate of a reel, a relatively fixed clamping member, a coacting clamping member slidable on said rod member, split collars provided with means for clamping them upon said clamping members, oppositely disposed studs on said collars, a U-shaped lever detachably engageable with the studs of one of the collars with the arms of the lever projecting beyond the studs, and links pivotally connected to the projecting ends of the arms of the lever and provided with a series of holes selectively engageable with the studs of the other collar.

15. In a reel seat for fishing rods, the combination of a rod member adapted to receive the seat plate of a reel, a relatively fixed clamping member, a coacting clamping member slidable on said rod member, split collars provided with means for clamping them upon said clamping members, oppositely disposed studs on said collars, a lever mounted on the studs of one of the collars with the arms of the lever projecting beyond the studs, and links pivotally connected to the lever and the studs of the other collar.

16. In a reel seat for fishing rods, the combination of a rod member adapted to receive the seat plate of a reel, a relatively fixed clamping member, a coacting clamping member slidable on said rod member, said clamping members being provided with laterally projecting studs, a U-shaped lever detachably engageable with said studs on one of the clamping members with the arms of the lever projecting beyond the studs, and links pivotally connected to the projecting ends of the arms of the lever and provided with a series of holes selectively engageable with the studs of the other clamping member.

17. In a reel seat for fishing rods, the combination of a rod member adapted to receive the seat plate of a reel, a relatively fixed clamping member, a coacting clamping member slidable on said rod member, said clamping members being provided with laterally projecting studs, a lever mounted on the studs of one of the clamping members, and links pivotally connected to the lever and engaged with the studs of the other clamping member.

18. In a reel seat for fishing rods, the combination of a rod member adapted to receive the seat plate of a reel, a pair of clamping members operatively associated to engage opposite ends of a reel seat plate when in actuated position, a U-shaped lever pivotally mounted on one of said clamping members, and links disposed on opposite sides of the rod member and pivotally connected to said lever and to the other clamping member, the bight portion of said lever being offset and conformed to embrace the under side of the rod member when the lever is in actuated position, the arms of the lever and the links lying at the sides of the rod member, the pivots for the lever and links being disposed so that the parts constitute a locking toggle when in actuated position.

19. In a reel seat for fishing rods, the combination of a rod member adapted to receive the seat plate of a reel, a pair of clamping members operatively associated to engage opposite ends of a reel seat plate when in actuated position, a lever pivotally mounted on one of said clamping members, and links disposed on opposite sides of the rod member and pivotally connected to said lever and to the other clamping member, the pivots for the lever and links being disposed so that the parts constitute a locking toggle when in actuated position.

20. In a reel seat for fishing rods, the combination of a rod member adapted to receive the seat plate of a reel, a relatively fixed clamping member, a coacting clamping member slidable on said rod, lever means pivotally mounted on one of said clamping members, and link means pivotally connected to the rod member and to said lever means, said lever means and link means coacting to provide a locking toggle when the lever means is in clamping position.

RALPH W. MILLER.